United States Patent
Hong et al.

(10) Patent No.: US 12,411,092 B2
(45) Date of Patent: Sep. 9, 2025

(54) OPTICAL MONITORING DEVICE

(71) Applicant: SAMSUNG ELECTRONICS CO., LTD., Suwon-si (KR)

(72) Inventors: Wooram Hong, Suwon-si (KR); Hyukju Kwon, Suwon-si (KR); Gahee Kim, Suwon-si (KR); Won Seok Oh, Suwon-si (KR); Hyunjeong Jeon, Suwon-si (KR); Hyun Do Choi, Suwon-si (KR); Minsu Chang, Suwon-si (KR); Younsuk Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 326 days.

(21) Appl. No.: 18/140,406

(22) Filed: Apr. 27, 2023

(65) Prior Publication Data

US 2024/0201093 A1    Jun. 20, 2024

(30) Foreign Application Priority Data

Dec. 15, 2022 (KR) .................. 10-2022-0175583

(51) Int. Cl.
*G01N 21/85* (2006.01)
*G01N 21/3577* (2014.01)

(52) U.S. Cl.
CPC .......... *G01N 21/85* (2013.01); *G01N 21/3577* (2013.01); *G01N 2021/8557* (2013.01);
(Continued)

(58) Field of Classification Search
CPC .............. G01N 21/85; G01N 21/3577; G01N 2021/8557; G01N 2201/0231;
(Continued)

(56) References Cited

U.S. PATENT DOCUMENTS 4,964,728 A    10/1990  Kloth et al.
6,724,797 B2   4/2004   Daiber
(Continued)

FOREIGN PATENT DOCUMENTS

CN  109317079 A   2/2019
CN  211347934 U   8/2020
(Continued)

OTHER PUBLICATIONS

Stotzel, Jan et al., "QEXAFS and UV/Vis Simultaneous Monitoring of the TiO2-Nanoparticles Formation by Hydrolytic Sol-Gel Route", J. Phys. Chem. C, 2010, vol. 114, No. 14, pp. 6228-6236.
(Continued)

*Primary Examiner* — Md M Rahman
(74) *Attorney, Agent, or Firm* — Sughrue Mion, PLLC

(57) ABSTRACT

The present disclosure provides optical monitoring devices. In some embodiments, the optical monitoring device includes a heating stirrer, a floating barrel, and a support body arranged to support the floating barrel. The floating barrel includes a barrel body facing the heating stirrer and spaced apart from the heating stirrer by a gap, a cavity provided in the barrel body and configured to accommodate at least one of a vessel and a conduit, an irradiator arranged in the barrel body and configured to radiate light to the cavity, and a light receiver arranged in the barrel body, aligned with the irradiator and the cavity, and configured to receive light from the cavity.

20 Claims, 15 Drawing Sheets

(52) U.S. Cl.
CPC ............. *G01N 2201/0231* (2013.01); *G01N 2201/061* (2013.01)

(58) Field of Classification Search
CPC ............. G01N 2201/061; G01N 21/75; G01N 2021/8416; G01N 2201/08; G01N 2201/1296; G01N 21/272; G01N 21/31; G01N 21/25; B01F 33/452; G02B 7/02; G02B 26/001
USPC ........................................................ 356/432
See application file for complete search history.

(56) References Cited

U.S. PATENT DOCUMENTS

| | | | |
|---|---|---|---|
| 9,609,219 B2 | 3/2017 | Howarth et al. | |
| 2016/0129407 A1* | 5/2016 | Wrosch | B01F 35/2142 366/108 |
| 2019/0337222 A1* | 11/2019 | Gu | B29C 64/129 |

FOREIGN PATENT DOCUMENTS

| | | |
|---|---|---|
| EP | 0 637 998 B2 | 4/2006 |
| JP | 11-218485 A | 8/1999 |
| JP | 3895317 B2 | 3/2007 |
| KR | 10-0892309 B1 | 4/2009 |
| KR | 10-2011-0074979 A | 7/2011 |
| KR | 10-1605995 B1 | 4/2016 |
| WO | 2007/129327 A1 | 11/2007 |

OTHER PUBLICATIONS

Guangfa, Gao et al., "Experimental Investigation on Thermal Physical Properties of an Advanced Glass Fiber Composite Material", Physics Procedia, 2012, vol. 25, pp. 339-344.

* cited by examiner

OPTICAL MONITORING DEVICE

CROSS-REFERENCE TO RELATED APPLICATIONS

This application claims benefit of priority under 35 USC § 119 of Korean Patent Application No. 10-2022-0175583, filed on Dec. 15, 2022, in the Korean Intellectual Property Office, the disclosure of which is incorporated by reference herein in its entirety.

BACKGROUND

1. Field

The present disclosure relates generally to an optical monitoring device.

2. Description of Related Art

A device has been developed for analyzing a pattern of light that passes through, or is deflected or scattered from a liquid sample. The device may detect the light that is not absorbed by the liquid sample. When a path of light between a light source of the device, the liquid sample, and a detector of the device is precisely set, the device may produce repeatable and iterative measurement results.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to an aspect of the present disclosure, an optical monitoring device is provided. The optical monitoring device includes a heating stirrer, a floating barrel, and a support body arranged to support the floating barrel. The floating barrel includes a barrel body facing the heating stirrer and spaced apart from the heating stirrer by a gap, a cavity provided in the barrel body and configured to accommodate at least one of a vessel and a conduit, an irradiator arranged in the barrel body and configured to radiate light to the cavity, and a light receiver arranged in the barrel body, aligned with the irradiator and the cavity, and configured to receive light from the cavity.

In some embodiments, in the optical monitoring device a size of the gap between the barrel body and the heating stirrer may be greater than or equal to approximately 3 mm.

In some embodiments, the support body of the optical monitoring device may include a holder configured to hold the floating barrel, a plurality of guide rails configured to guide movement of the holder, and a plurality of legs coupling the holder to the plurality of guide rails.

In some embodiments, the support body of the optical monitoring device may further include a knob configured to adjust a position of a leg of the plurality of legs on a corresponding guide rail of the plurality of guide rails.

In some embodiments, each of the plurality of legs may include a tab hole configured to pass a corresponding guide rail of the plurality of guide rails.

In some embodiments, the heating stirrer may include a heating plate facing the barrel body, and a jig protruding from the heating plate, and configured to separate the at least one of a vessel and a conduit, from the barrel body.

In some embodiments, the jig may include a first slit aligned with the irradiator, and a second slit aligned with the light receiver.

In some embodiments, the barrel body may include an insulating material.

In some embodiments, the barrel body may include a first passage extending from the cavity and configured to accommodate the irradiator, and a second passage extending from the cavity and configured to accommodate the light receiver.

In some embodiments, each of the irradiator and the light receiver may include at least one lens, and a lens housing configured to accommodate the at least one lens. The lens housing may be further configured to be detachably coupled to the barrel body.

In some embodiments, the at least one lens may include a converging lens and a diverging lens.

In some embodiments, the optical monitoring device may further include a light source configured to generate light in a determined wavelength band, and a spectroscope configured to analyze at least a portion of the light generated by the light source and received by the light receiver that has been radiated by the irradiator and has passed through the at least one of a vessel and a conduit.

In some embodiments, the optical monitoring device may further include a chiller configured to cool the at least one of a vessel and a conduit.

In some embodiments, the optical monitoring device may further include a circulator configured to circulate a cooling liquid to the chiller.

In some embodiments, the barrel body may further include an access area open to the cavity.

In some embodiments, the optical monitoring device may further include a shaft, and an arm configured to connect the shaft to the floating barrel and rotate relative to the shaft.

In some embodiments, the optical monitoring device may further include a first linear guide configured to guide linear movement of a first lens of the irradiator in a first direction toward the cavity and a second direction away from the cavity, and a second linear guide configured to guide linear movement of a second lens the light receiver in the first direction toward the cavity and the second direction away from the cavity.

In some embodiments, the optical monitoring device may further include a tab configured to secure a lens of at least one of the irradiator and the light receiver, and an elastic body configured to elastically support the tab.

In some embodiments, the optical monitoring device may further include a slider configured to slide in a first direction away from the lens, slide in a second direction toward the lens, and deform the elastic body.

In some embodiments, the optical monitoring device may further include a handle coupled to the slider.

Additional aspects are set forth in part in the description which follows and, in part, may be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
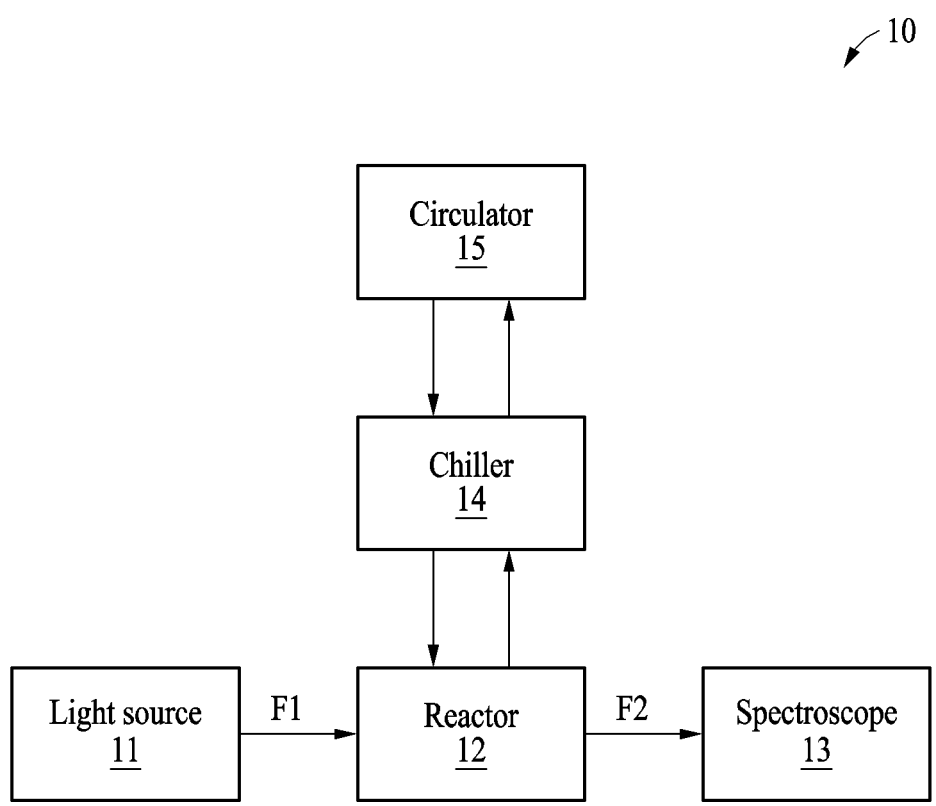
FIG. 1 is a block diagram illustrating an optical monitoring device, according to an embodiment.

Hereinafter, example embodiments are described in detail with reference to the accompanying drawings. However, various alterations and modifications may be made to the example embodiments. That is, the example embodiments are not construed as limited to the disclosure. The example embodiments should be understood to include all changes, equivalents, and replacements within the idea and the technical scope of the disclosure.

The terminology used herein is for the purpose of describing particular example embodiments only and is not to be limiting of the example embodiments. The singular forms "a", "an", and "the" are intended to include the plural forms as well, unless the context clearly indicates otherwise. It is to be understood that the terms "comprises/comprising" and/or "includes/including" when used herein, may specify the presence of stated features, integers, steps, operations, elements, and/or components, but may not preclude the presence and/or addition of one or more other features, integers, steps, operations, elements, components and/or groups thereof.

Unless otherwise defined, all terms including technical and scientific terms used herein have the same meaning as commonly understood by one of ordinary skill in the art to which example embodiments belong. It is to be further understood that terms, such as those defined in commonly-used dictionaries, should be interpreted as having a meaning that is consistent with their meaning in the context of the relevant art and may not be interpreted in an idealized or overly formal sense unless expressly so defined herein.

When describing the example embodiments with reference to the accompanying drawings, like reference numerals refer to like constituent elements and a repeated description related thereto may be omitted. The accompanying drawings may not be to scale, and the relative size, proportions, and depiction of elements in the drawings may be exaggerated for clarity, illustration, and/or convenience. In the description of example embodiments, detailed description of well-known related structures or functions may be omitted when it is deemed that such description may cause ambiguous interpretation of the present disclosure.

Also, in the description of the components, terms such as first, second, A, B, (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

It is to be understood that when an element or layer is referred to as being "over," "above," "on," "below," "under," "beneath," "connected to" or "coupled to" another element or layer, it can be directly over, above, on, below, under, beneath, connected or coupled to the other element or layer or intervening elements or layers may be present. In contrast, when an element is referred to as being "directly over," "directly above," "directly on," "directly below," "directly under," "directly beneath," "directly connected to" or "directly coupled to" another element or layer, there may no intervening elements or layers present. The terms "upper," "middle", "lower", etc. may be replaced with terms, such as "first," "second," third" to be used to describe relative positions of elements.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

The same name may be used to describe an element included in the example embodiments described above and an element having a common function. Unless otherwise mentioned, the descriptions on the example embodiments may be applicable to the following example embodiments and thus, duplicated descriptions may be omitted for conciseness.

FIG. 1 is a block diagram illustrating an optical monitoring device, according to an embodiment.

Referring to FIG. 1, an optical monitoring device 10 may be configured to measure, observe, and/or detect an in-situ reactant in a chemical reaction process. Light generated by a light source 11 may travel to a reactor 12 through at least one optical fiber F1 connecting the light source 11 to the reactor 12. The light source 11 may be configured to generate light in one or more predetermined wavelength bands. In an embodiment, the light source 11 may be configured to generate light in at least one of an ultraviolet band, a visible band, and an infrared band. Alternatively or additionally, the light source 11 may be configured to generate a plurality of light rays in corresponding bands. For example, a first light in a first wavelength band generated by the light source 11 may travel to the reactor 12 through one optical fiber F1. Alternatively or additionally, a second light in a second wavelength band, that is different from the first wavelength band, and generated by the light source 11 may travel to the reactor 12 through another optical fiber F1. The light that traveled to the reactor 12 may penetrate (e.g., pass-through) and/or may be absorbed by a substance in the reactor 12.

The reactor 12 may be configured to provide thermal energy and/or stirring energy to an environment (e.g., a reaction vessel and/or a conduit) in which the substance is disposed. An in-situ chemical reaction process of a substance in the reactor 12 may be monitored in order to assess the stability of the chemical reaction and/or whether the chemical reaction is an intended reaction process. The monitoring and/or assessment of the chemical reaction process may include measuring and/or controlling of at least one a heat supply amount, a heat supply time, a temperature control time, other control parameters of the reactor 12, and/or a combination thereof. For example, the control parameters may be determined to obtain a maximum efficiency and/or a maximum yield of the chemical reaction.

In an embodiment, the light penetrating (e.g., passing through) the substance may travel to a spectroscope 13 through at least one optical fiber F2 connecting the reactor 12 to the spectroscope 13. The spectroscope 13 may be configured to obtain spectroscopic pattern data based on a substance by analyzing the penetrating light during the chemical reaction in the reactor 12 in real-time. In an optional or additional embodiment, the spectroscopic pattern data may be used as training data input to a neural network. Consequently, the spectroscopic pattern data and/or training result data thereof may be used to predict a chemical reaction mechanism.

The optical monitoring device 10 may be applied to an application that monitors a chemical change of a substance in a vessel and/or a conduit for heating and/or stirring in real-time. For example, the optical monitoring device 10 may be applied to monitor a process of a pharmaceutical and/or chemical product that may need in-situ monitoring of a change in a component and/or a characteristic occurring in an environment in the unit of a vessel and/or a conduit. For another example, the optical monitoring device 10 may be applied to detect, identify, and/or select a target substance in a sealed state in a vessel and/or a conduit. For yet another example, the optical monitoring device 10 may be applied to a spectroscopic analysis using the light source 11 and the spectroscope 13.

In an embodiment, the optical monitoring device 10 may include a chiller 14. The chiller 14 may be configured to chill a vessel and/or a conduit in the reactor 12 to maintain the vessel and/or the conduit in an intended temperature range. For example, the chiller 14 may maintain a temperature of the reactor 12 to be in an intended temperature range by exchanging heat with the reactor 12 through a cooling liquid. That is, the chiller 14 may be configured to prevent a level of a solution from decreasing as a solvent boils and/or evaporates in a vessel and/or a conduit while a chemical reaction is conducted in the reactor 12 for an extended period of time, for example.

In an embodiment, the optical monitoring device 10 may include a circulator 15. The circulator 15 may form a circulation path of a cooling liquid between the chiller 14 and the circulator 15. The circulator 15 may provide a cooling liquid to the chiller 14 and/or may be provided with a cooling liquid by the chiller 14.

Figure 2:
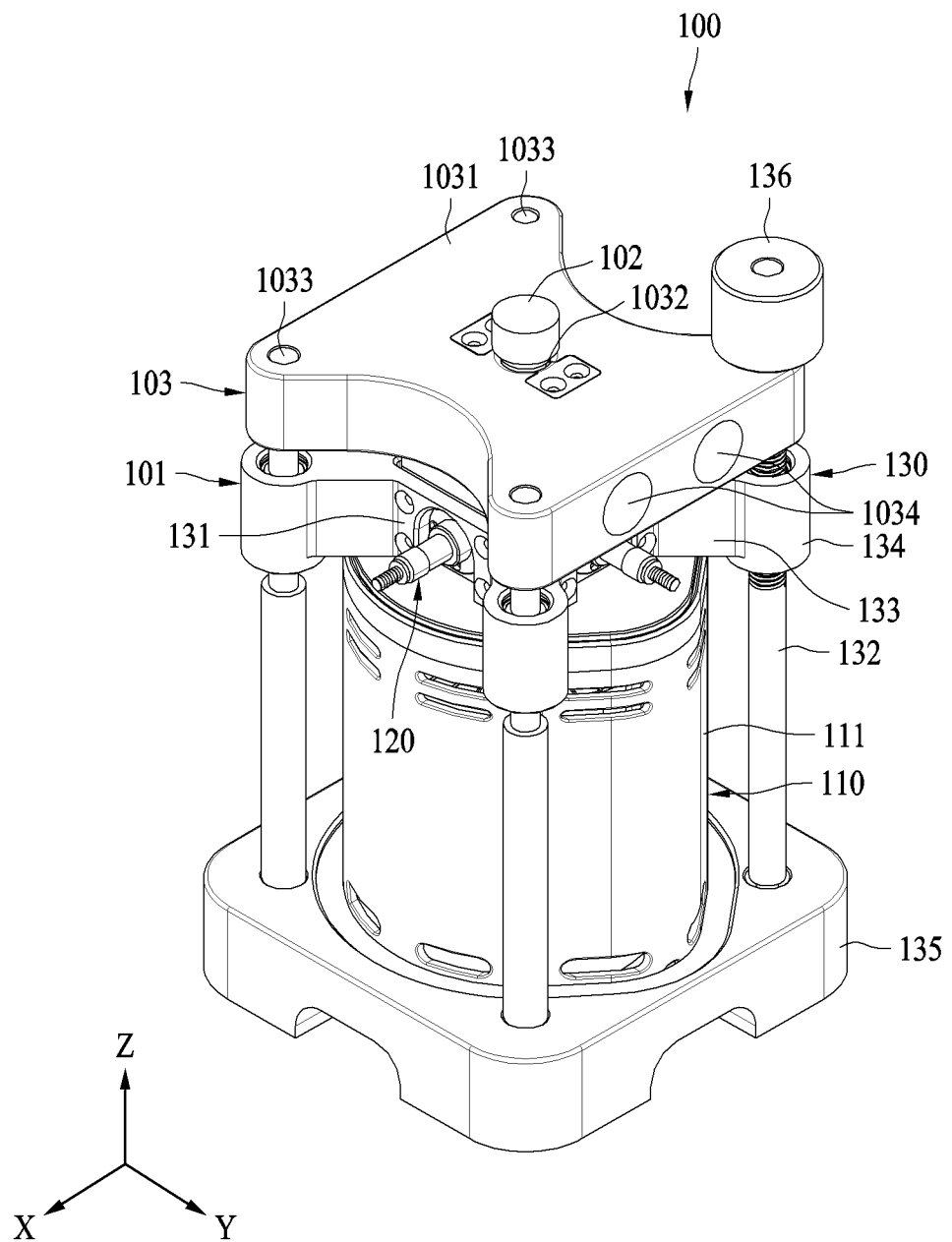
FIG. 2 is a perspective view of an optical monitoring device, according to an embodiment.
Figure 3:
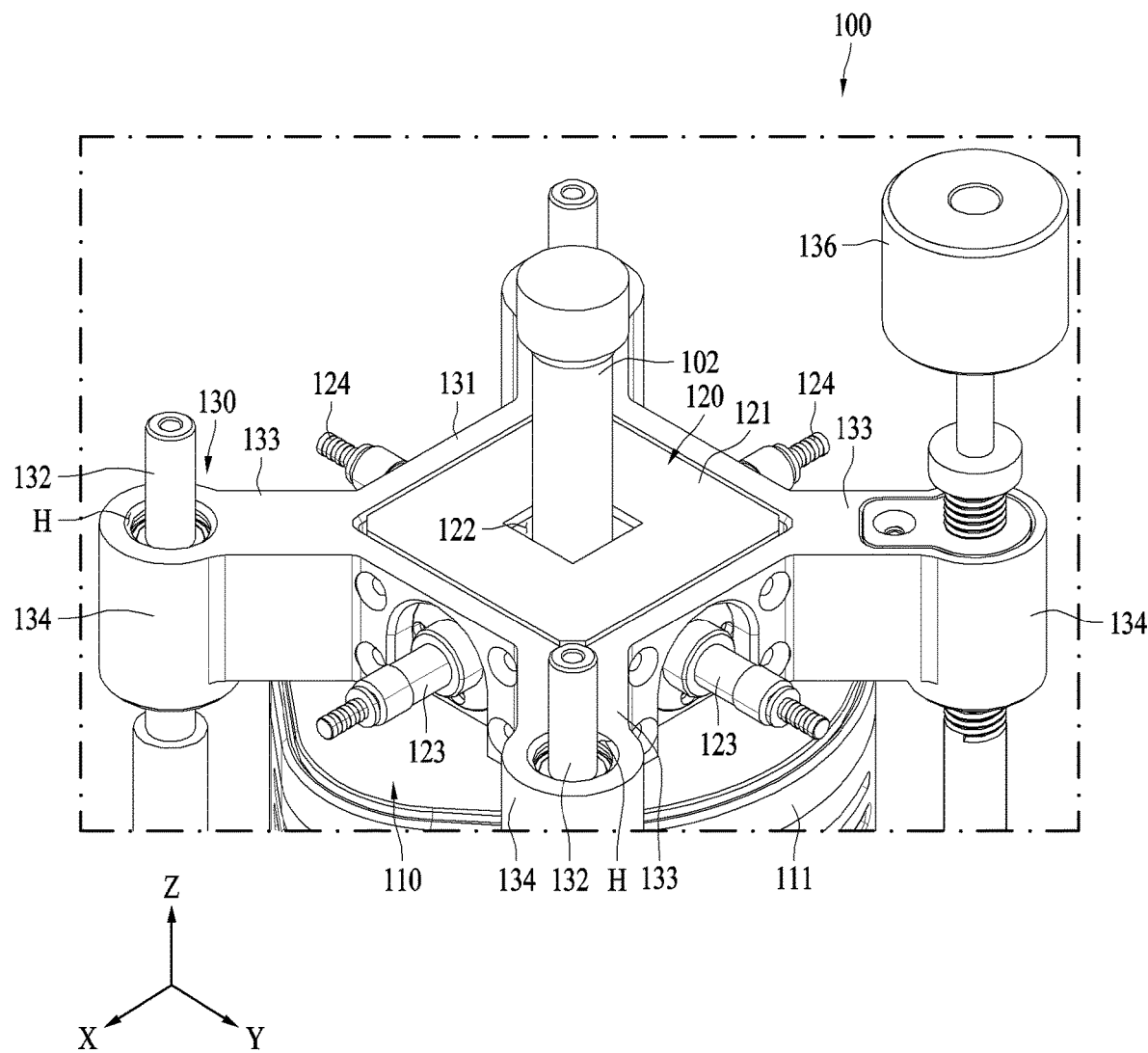
FIG. 3 is a perspective view of a floating barrel, according to an embodiment.
Figure 4:
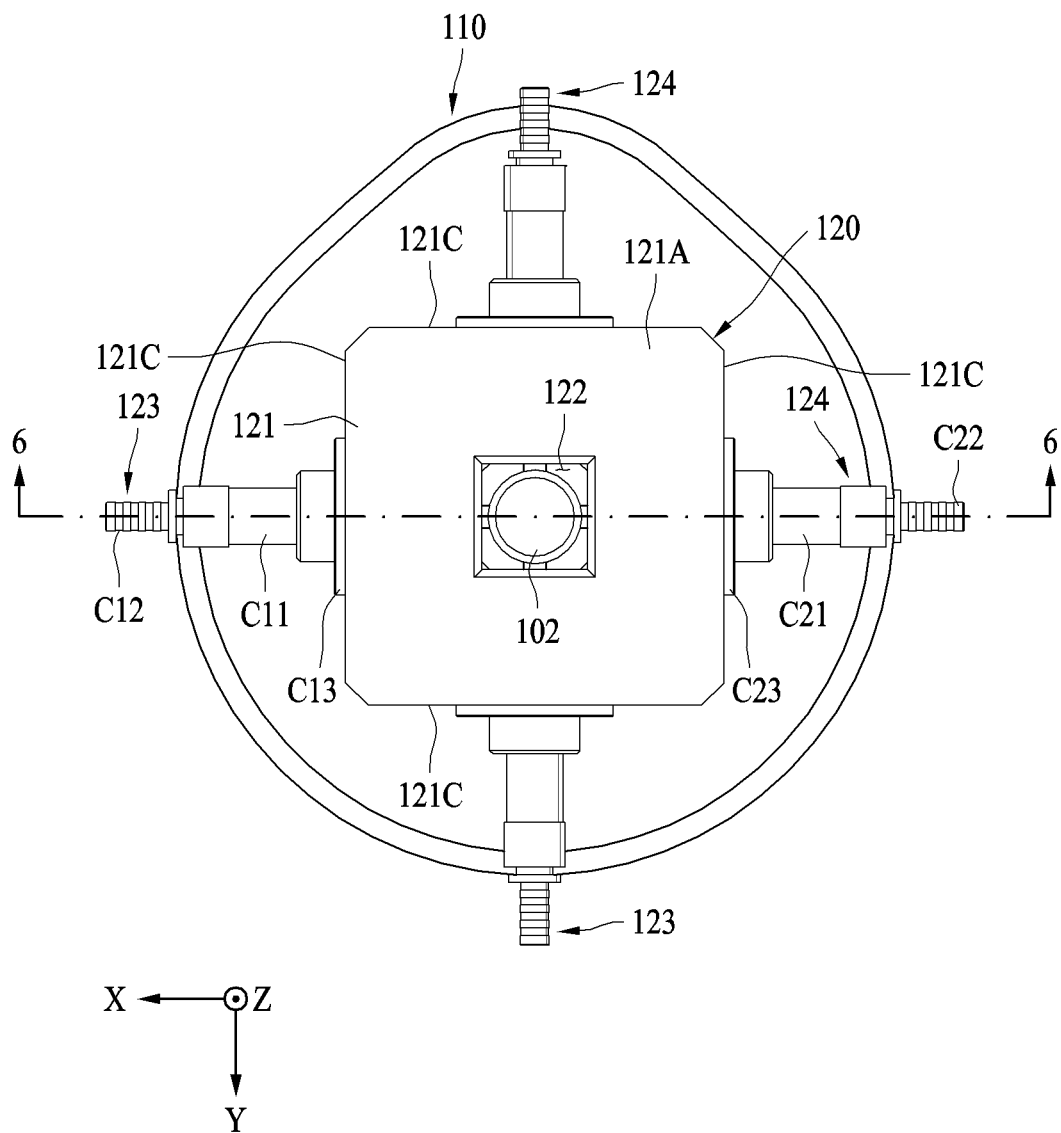
FIG. 4 is a plan view of the floating barrel, according to an embodiment.
Figure 5:
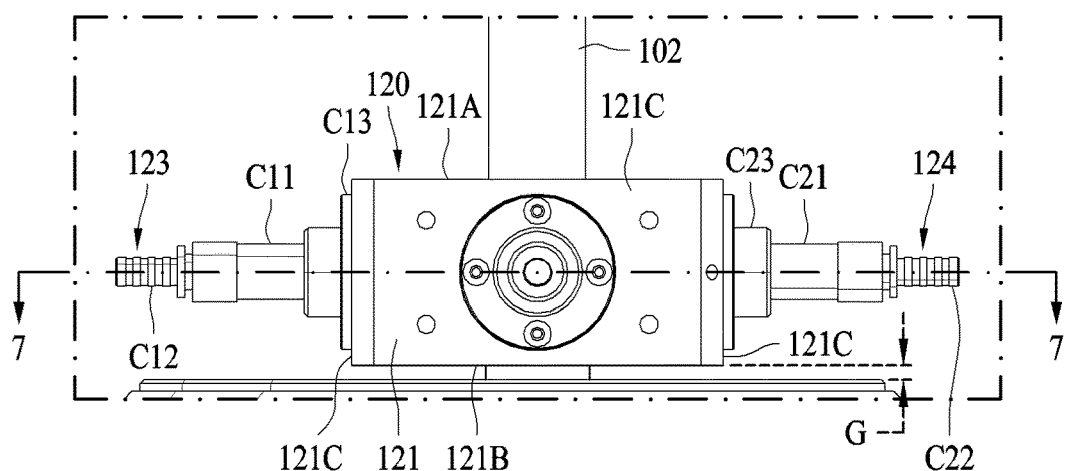
FIG. 5 is a side view of the floating barrel, according to an embodiment.
Figure 6:
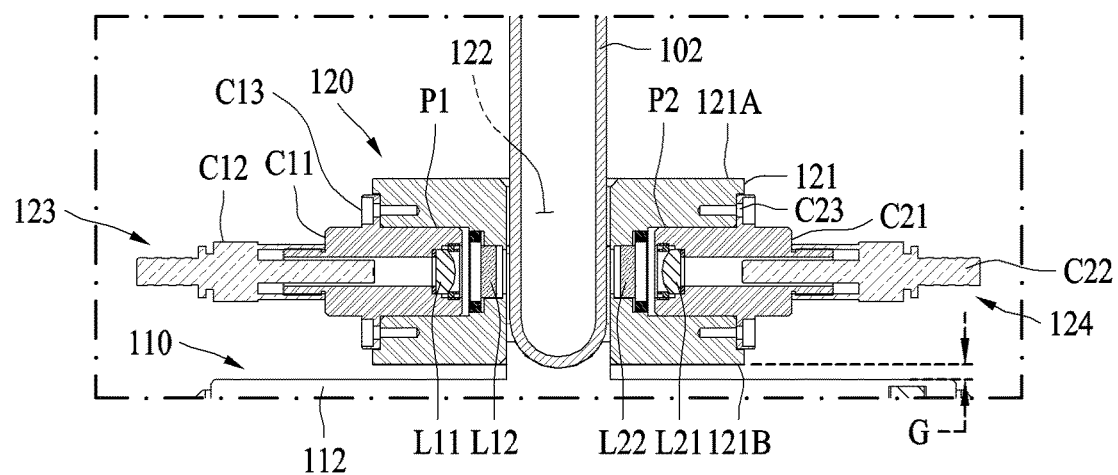
FIG. 6 is a cross-sectional view of the floating barrel of FIG. 4 taken along a line 6-6, according to an embodiment.
Figure 7:
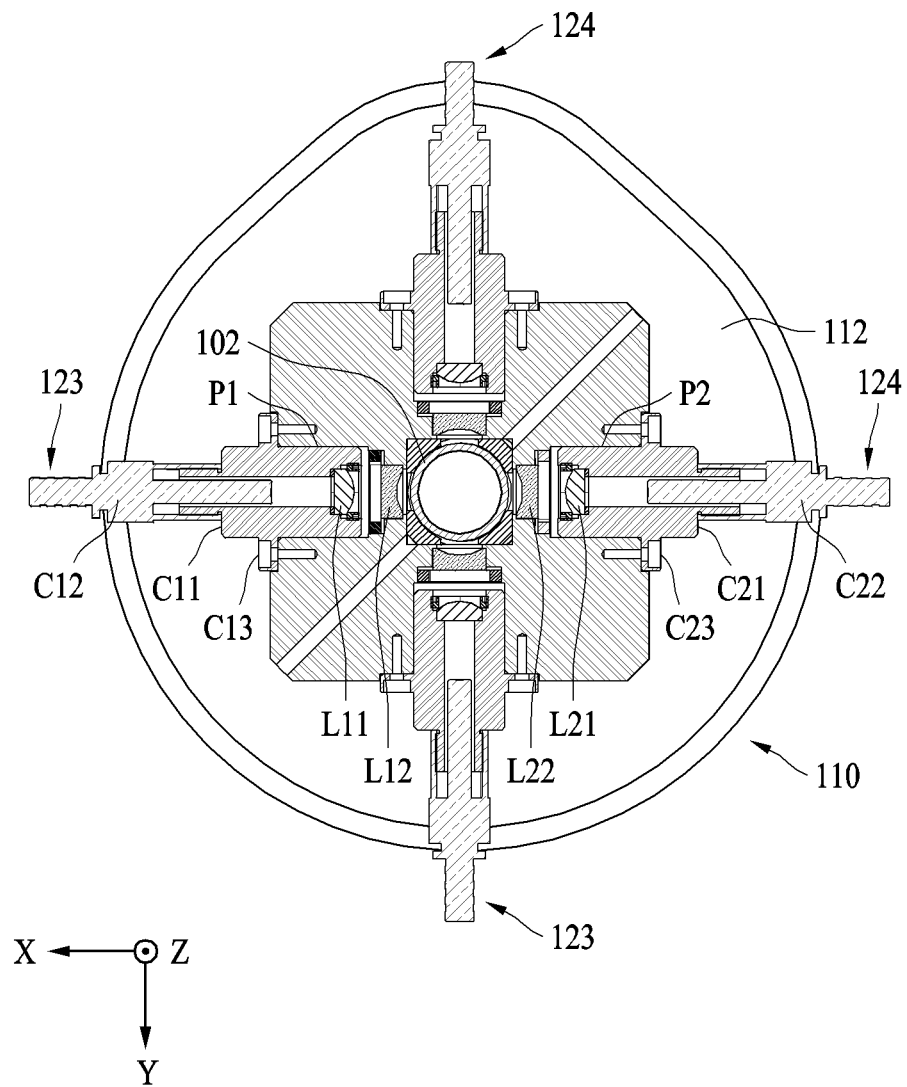
FIG. 7 is a cross-sectional view of the floating barrel of FIG. 5 taken along a line 7-7, according to an embodiment.

FIG. 2 is a perspective view of an optical monitoring device, according to an embodiment. FIG. 3 is a perspective view of a floating barrel, according to an embodiment. FIG. 4 is a plan view of the floating barrel, according to an embodiment. FIG. 5 is a side view of the floating barrel, according to an embodiment. FIG. 6 is a cross-sectional view of the floating barrel of FIG. 4 taken along a line 6-6, according to an embodiment. FIG. 7 is a cross-sectional view of the floating barrel of FIG. 5 taken along a line 7-7, according to an embodiment.

Referring to FIGS. 2 to 7, an optical monitoring device 100 may include a reactor 101. The reactor 101 may allow a chemical reaction of a substance in a reaction vessel 102 to proceed.

In an embodiment, the reactor 101 may include a heating stirrer 110. The heating stirrer 110 may be configured to generate thermal energy and/or stirring energy.

In an embodiment, the heating stirrer 110 may include a driving unit 111. The driving unit 111 may include a cylindrical shape. The driving unit 111 may include a magnetic bar for providing a stirring action to a liquid in the driving unit 111. The driving unit 111 may further include a magnet and/or an electromagnetic element (e.g., a coil) configured to drive a motion of the magnetic bar. The driving unit 111 may further include a heating element configured to generate thermal energy.

In an embodiment, the heating stirrer 110 may include a heating plate 112. The heating plate 112 may have a substantially circular and/or elliptical cross-section. The heating plate 112 may be disposed on the driving unit 111. The heating plate 112 may include, but not be limited to, a metal material (e.g., aluminum). The heating plate 112 may be physically connected to the driving unit 111. Alternatively or additionally, the heating plate 112 may be thermally coupled to the driving unit 111. That is, when vibration energy and thermal energy generated by the driving unit 111 are transferred to the heating plate 112, the heating plate 112 may be configured to vibrate and transfer the thermal energy to the reaction vessel 102.

In an embodiment, the reactor 101 may include a floating barrel 120. The floating barrel 120 may be configured to float from the heating stirrer 110. The floating barrel 120 may be isolated from the thermal energy and/or the vibration energy generated by the heating stirrer 110.

The floating barrel 120 may include a barrel body 121. The barrel body 121 may include a first barrel surface 121A (e.g., a top barrel surface), a second barrel surface 121B (e.g., a bottom barrel surface) opposite to the first barrel surface 121A, and a plurality of side barrel surfaces 121C between the first barrel surface 121A and the second barrel surface 121B. The barrel body 121 may have a substantially hexahedral shape having four side barrel surfaces 121C. Alternatively or additionally, the barrel body 121 may have a substantially cylindrical shape having one side barrel surface 121C.

The barrel body 121 may face the heating stirrer 110. The second barrel surface 121B may face a surface (e.g., a surface in a +Z normal direction) of the heating plate 112. The barrel body 121 may be physically separated and/or spaced apart from the heating stirrer 110 with a gap G. The size of the gap G may refer to a distance between the second barrel surface 121B and a surface (e.g., the surface in the +Z normal direction) of the heating plate 112 facing the second barrel surface 121B.

The barrel body 121 may include an insulating material. For example, the insulating material may include, but not be limited to, polytetrafluoroethylene (PTFE) (also referred to as Teflon®). Consequently, in an embodiment, the barrel body 121 may exhibit decreased thermal deformation when compared to a related barrel body. Alternatively or additionally, the barrel body 121 may have a decreased heat transfer rate when compared to the related barrel body.

In an embodiment, the floating barrel 120 may include a cavity 122. The cavity 122 may be configured to accommodate the reaction vessel 102. In an optional or additional embodiment, the cavity 122 may have a cross-section with a polygonal (e.g., quadrangular) shape. Alternatively or additionally, the cavity 122 may have a substantially circular and/or elliptical cross-section. The cavity 122 may extend from the first barrel surface 121A to the second barrel surface 121B. When the reaction vessel 102 is accommodated in the cavity 122, the reaction vessel 102 may contact the heating plate 112. The cavity 122 may be disposed on the central portion of the barrel body 121.

In an embodiment, the floating barrel 120 may include a plurality of irradiators 123. The plurality of irradiators 123 may be configured to radiate light toward the cavity 122. The plurality of irradiators 123 may be disposed on respective side barrel surfaces 121C. For example, a pair of irradiators 123 adjacent to each other may be disposed on side barrel surfaces 121C (e.g., the side barrel surface 121C in the +X normal direction and the side barrel surface 121C in the +Y normal direction) adjacent to each other, respectively. Alternatively or additionally, the plurality of irradiators 123 may be configured to radiate lights in different wavelength bands. For example, one irradiator 123 may be configured to radiate light in one or more wavelength bands and another irradiator 123 may be configured to radiate light in one or more different wavelength bands. However, the present disclosure is not limited in this regard.

In an embodiment, the irradiator 123 may include a first converging lens L11 and a first diverging lens L12 arranged in-line with a light traveling direction (e.g., the −X direction). The first diverging lens L12 may be closer to the cavity 122 than the first converging lens L11. Alternatively, the first converging lens L11 may be closer to the cavity 122 than the first diverging lens L12. Each of the first converging lens L11 and the first diverging lens L12 may include, but not be limited to, a bi-convex lens, a plano-convex lens, a meniscus convex lens, other converging lenses, and/or a combination thereof. A combination of the first converging lens L11 and the first diverging lens L12 may cause light to be radiated to the reaction vessel 102 in a direction (e.g., the −X direction) substantially orthogonal to an arrangement direction (e.g., the Z direction) of the reaction vessel 102.

In an embodiment, the irradiator 123 may include a first lens housing C11. The first lens housing C11 may be configured to accommodate the first converging lens L11. The first diverging lens L12 may be disposed inside the barrel body 121 and may be disposed on a first passage P1 between the side barrel surface 121C and the cavity 122. The first diverging lens L12 may be disposed outside the first lens housing C11. The first lens housing C11 may have a substantially cylindrical shape. The first lens housing C11 may include cylindrical parts having different diameters and forming a step therebetween. A portion of a cylindrical part having a large diameter of the first lens housing C11 may be disposed on the first passage P1. Alternatively or additionally, another portion of the cylindrical part having a large diameter of the first lens housing C11 may extend from the side barrel surface 121C. In an embodiment, a cylindrical part having a small diameter of the first lens housing C11 may be connected to the cylindrical part having a large diameter and may be disposed outside the barrel body 121.

In an embodiment, the irradiator 123 may include a first connector C12. The first connector C12 may be connected to a light path inside the first lens housing C11. The first connector C12 may be connected to an optical fiber (e.g., the at least one optical fiber F1 of FIG. 1). Light may travel from the light source 11 to the first connector C12 through the optical fiber F1 and may be radiated to the reaction vessel 102 disposed in the cavity 122 through the first converging lens L11 and the first diverging lens L12 along the light path inside the first lens housing C11. A portion of the light radiated to the reaction vessel 102 may be absorbed by a reactant in the reaction vessel 102 and/or another portion of the light may penetrate (e.g., pass-through) the reactant in the reaction vessel 102.

In an embodiment, the irradiator 123 may include a first flange C13. The first flange C13 may be integrally and/or seamlessly connected to the first lens housing C11. The first flange C13 may be detachably coupled to the side barrel surface 121C of the barrel body 121 through one or more fasteners (e.g., a screw). In an optional or additional embodiment, the irradiator 123 may be replaced by another irradiator 123 including a new lens through detachable coupling with the first flange C13.

In an embodiment, the floating barrel 120 may include a plurality of light receivers 124. The plurality of light receivers 124 may be configured to receive light from the cavity 122. The plurality of light receivers 124 may be disposed on corresponding side barrel surfaces 121C. For example, a pair of light receivers 124 adjacent to each other may be disposed on side barrel surfaces 121C (e.g., the side barrel surface 121C in the −X normal direction and the side barrel surface 121C in the −Y normal direction) adjacent to each other, respectively. In an embodiment, each of the plurality of light receivers 124 may be disposed to be opposite to the corresponding irradiator 123. For example, each of the plurality of light receivers 124 may be aligned with the corresponding irradiator 123. The plurality of light receivers 124 may be configured to receive lights in different wavelength bands. For example, one light receiver 124 may be configured to receive light in one or more wavelength bands and another receiver 124 may be configured to receive light in one or more different wavelength bands. However, the present disclosure is not limited in this regard.

In an embodiment, the light receiver 124 may include a second converging lens L21 and a second diverging lens L22 arranged in-line with a direction (e.g., the +X direction) opposite to the light traveling direction. The second diverging lens L22 may be closer to the cavity 122 than the second converging lens L21. Alternatively, the second converging lens L21 may be closer to the cavity 122 than the second diverging lens L22. Each of the second converging lens L21 and the second diverging lens L22 may include, but not be limited to, a bi-convex lens, a plano-convex lens, a meniscus convex lens, other converging lenses, and/or a combination thereof. A combination of the second converging lens L21 and the second diverging lens L22 may cause the reaction vessel 102 to receive light in a direction (e.g., the −X direction) substantially orthogonal to an arrangement direction (e.g., the Z direction) of the reaction vessel 102.

In an embodiment, the light receiver 124 may include a second lens housing C21. The second lens housing C21 may be configured to accommodate the second converging lens L21. The second diverging lens L22 may be disposed inside the barrel body 121. Alternatively or additionally, the second diverging lens L22 may be disposed on a second passage P2 between the side barrel surface 121C and the cavity 122. In an operational or additional embodiment, the second diverging lens L22 may be disposed outside the second lens housing C21. The second lens housing C21 may have a substantially cylindrical shape. For example, the second lens housing C21 may have cylindrical parts having different diameters and forming a step therebetween. A portion of a cylindrical part having a large diameter of the second lens housing C21 may be disposed on the second passage P2. The second passage P2 may be on substantially the same line as the first passage P1. Alternatively or additionally, another portion of the cylindrical part having a large diameter of the second lens housing C21 may extend from the side barrel surface 121C. A cylindrical part having a small diameter of the second lens housing C21 may be connected to the cylindrical part having a large diameter and may be disposed outside the barrel body 121.

In an embodiment, the light receiver 124 may include a second connector C22. The second connector C22 may be connected to a light path inside the second lens housing C21. The second connector C22 may be connected to an optical fiber (e.g., the at least one optical fiber F2 of FIG. 1). The light penetrating (e.g., passing through) a reactant in the reaction vessel 102 may travel to the second connector C22 through the second diverging lens L22 and the second converging lens L21 along the light path provided in the second lens housing C21 and may travel to the spectroscope 13 through the optical fiber F2.

In an embodiment, the light receiver 124 may include a second flange C23. The second flange C23 may be integrally and/or seamlessly connected to the second lens housing C21. Alternatively or additionally, the second flange C23 may be detachably coupled to the side barrel surface 121C of the barrel body 121 through one or more fasteners (e.g., a screw). In an optional or additional embodiment, the light receiver 124 may be replaced by another light receiver 124 including a new lens through detachable coupling with the second flange C23.

In an embodiment, the reactor 101 may include a support body 130. The support body 130 may be configured to support the floating barrel 120. The floating barrel 120 may maintain a floating state physically and/or thermally separated from the heating stirrer 110 as the floating barrel 120 is supported by the support body 130.

In an embodiment, the support body 130 may include a holder 131. The holder 131 may be configured to hold the barrel body 121. Alternatively or additionally, the holder 131 may surround the plurality of side barrel surfaces 121C of the barrel body 121. The holder 131 may be coupled (e.g., fastened) to the plurality of side barrel surfaces 121C of the barrel body 121. The holder 131 may include passage openings through which the plurality of irradiators 123 and the plurality of light receivers 124 disposed in the barrel body 121 pass.

In an embodiment, the support body 130 may include a plurality of guide rails 132. The plurality of guide rails 132 may be spaced apart from corner regions of the holder 131. Alternatively or additionally, the plurality of guide rails 132 may be disposed on corresponding corner regions of the holder 131. The plurality of guide rails 132 may have a shape (e.g., a shaft shape) extending in a longitudinal direction. For example, the plurality of guide rails 132 may extend in the Z-axis direction. Each of the plurality of guide rails 132 may include a screw thread formed on the outer surface of the guide rail 132.

In an embodiment, the plurality of guide rails 132 may be configured to guide liner movement of the holder 131. For example, as movement of the holder 131 in the Z-axis direction may be guided by the plurality of guide rails 132, the size of the gap G (e.g., a distance) between the second barrel surface 121B of the barrel body 121 and a surface (e.g., the surface in the +Z normal direction) of the heating plate 112 may be adjusted.

In an optional or additional embodiment, the plurality of guide rails 132 may guide tilting of the holder 131. The plurality of guide rails 132 may be connected to corresponding corner regions of the holder 131. Consequently, the plurality of guide rails 132 may adjust a posture of the holder 131 relative to the Z-axis by independently adjusting the height (e.g., displacement in the Z-axis direction) of the corresponding corner regions of the holder 131. For example, to tilt the holder 131 by +45 degrees relative to the X-axis and +45 degrees relative to the Y-axis, when a position of a corner region of the holder 131 is fixed relative to the guide rail 132 that is arranged in a direction of +45 degrees relative to the X-axis and +45 degrees relative to the Y-axis, positions of the corner regions of the holder 131 relative to the other guide rails 132 may be set to be higher than the fixed position.

In an embodiment, the support body 130 may include a plurality of legs 133. The plurality of legs 133 may be configured to connect the holder 131 to the corresponding guide rail 132. For example, each of the plurality of legs 133 may extend from the corresponding corner region of the holder 131 to the guide rail 132.

In an embodiment, the support body 130 may include a plurality of sliders 134. Each of the plurality of sliders 134 may be configured to slide on the corresponding guide rail 132. Each of the sliders 134 may be connected to the corresponding leg 133. The holder 131, the plurality of legs 133, and the plurality of sliders 134 may be integrally and/or seamlessly formed.

In an embodiment, each of the plurality of sliders 134 may include a tab hole H through which the corresponding guide rail 132 passes. The tab hole H may include a screw thread formed on the inner surface of the tab hole. For example, the screw thread may be configured to engage with a screw thread formed on the outer surface of the guide rail 132. Fine adjustment of displacement of the slider 134 may be implemented by engagement of the screw thread of the tab hole H with the screw thread of the guide rail 132.

In an embodiment, the support body 130 may include a base 135. The base 135 may function as a pedestal configured to support the driving unit 111 and the plurality of guide rails 132. For example, the driving unit 111 may be disposed on a central region of the base 135 and the plurality of guide rails 132 may be disposed on corresponding corner regions of the base 135. Alternatively or additionally, the plurality of guide rails 132 may be separated from the driving unit 111 on the base 135.

In an embodiment, the support body 130 may include a knob 136. The knob 136 may be configured to adjust a position of the slider 134 on the guide rail 132. Alternatively or additionally, the knob 136 may be coupled to an end of the guide rail 132. For example, the knob 136 may adjust a position of the slider 134 on the guide rail 132 by rotating the guide rail 132. Position adjustment of the slider 134 may lead to adjustment of a position of the leg 133 corresponding to the slider 134, and position adjustment of the leg 133 may lead to position adjustment of a corner region of the holder 131 connected to the leg 133.

In an embodiment, the support body 130 may include one guide rail, one leg, and/or one slider.

In an embodiment, the optical monitoring device 100 may include a chiller 103. The chiller 103 may be configured to chill the reaction vessel 102.

In an embodiment, the chiller 103 may include a chilling block 1031. The chilling block 1031 may be disposed on and/or above the floating barrel 120 and the holder 131.

In an embodiment, the chiller 103 may include an accommodating opening 1032. The accommodating opening 1032 may be configured to accommodate the reaction vessel 102. The accommodating opening 1032 may be disposed in a central region of the chilling block 1031. Alternatively or additionally, the accommodating opening 1032 may be substantially aligned with the cavity 122.

In an embodiment, the chiller 103 may include a plurality of coupling openings 1033. Each of the plurality of coupling openings 1033 may be configured to be coupled to a corresponding guide rail 132. Alternatively or additionally, each of the plurality of coupling openings 1033 may be configured to be coupled to the knob 136. The plurality of coupling openings 1033 may be disposed in corresponding corner regions of the chilling block 1031.

In an embodiment, the chiller 103 may include a plurality of chilling passages 1034. The plurality of chilling passages 1034 may be configured to accommodate a cooling liquid conduit from a circulator (e.g., circulator 15 of FIG. 1) and a cooling liquid conduit leading to the circulator 15. Heat exchange with the reaction vessel 102 may be performed through the chilling block 1031 from cooling liquid conduits respectively accommodated in the plurality of chilling passages 1034. The temperature of the reaction vessel 102 may be maintained to be in a determined temperature range. A vaporized substance in the reaction vessel 102 may condense. The condensation may prevent a decrease in a level of a solution in the reaction vessel 102 as a solvent in the reaction vessel 102 boils and vaporizes when monitoring a long-term reaction.

Figure 8:
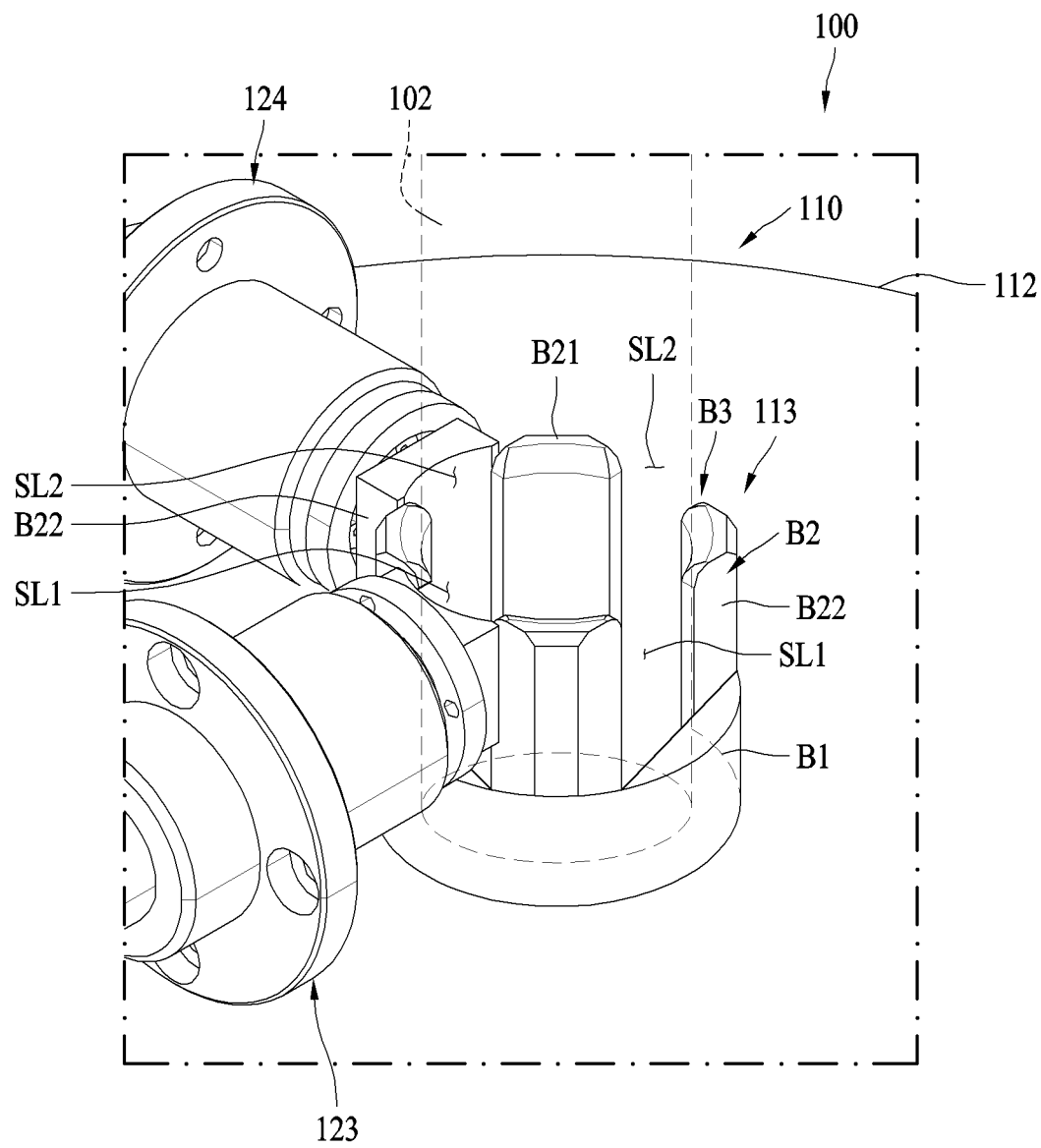
FIG. 8 is a perspective view of a jig, according to an embodiment.
Figure 8:
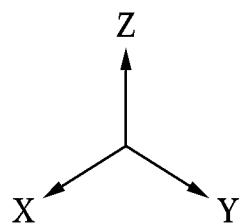

FIG. 8 is a perspective view of a jig, according to an embodiment.

Referring to FIG. 8, the optical monitoring device 100 may include the heating stirrer 110. The heating stirrer 110 may include a heating plate 112 and a jig 113. The jig 113 may be configured to fix the reaction vessel 102 in place. In an embodiment, the jig 113 may be configured to separate the reaction vessel 102 from the barrel body 121 of FIGS. 2 to 7. The reaction vessel 102, which may be separated from the barrel body 121, may not contact the barrel body 121 by the jig 113. Alternatively or additionally, the jig 113 may be disposed inside the cavity 122 of FIGS. 2 to 7.

In an embodiment, the jig 113 may include a jig base B1. The jig base B1 may protrude in a direction (e.g., the +Z direction) from a region (e.g., a central region) of a surface (e.g., the surface in the +Z normal direction) of the heating plate 112. In an optional or additional embodiment, the jig base B1 may have a substantially cylindrical shape.

In an embodiment, the jig 113 may include a jig body B2. The jig body B2 may include a jig end surface B21 opposite to a surface (e.g., the surface in the +Z normal direction) of the jig base B1 and a plurality of jig side surfaces B22 between the jig end surface B21 and the surface of the jig base B1. In an optional or additional embodiment, the jig body B2 may have a substantially polygonal shape. The plurality of jig side surfaces B22 and a side surface of the jig base B1 may form a gap.

In an embodiment, the jig 113 may include a hollow portion B3. The hollow portion B3 may be configured to accommodate the reaction vessel 102. The hollow portion B3 may extend from the jig end surface B21 to another surface (e.g., the surface in the −Z normal direction) of the jig base B1. Alternatively or additionally, the hollow portion B3 may be formed across the jig base B1 and the jig body B2. The reaction vessel 102 disposed in the hollow portion B3 may contact the heating plate 112.

In an embodiment, the jig 113 may include a plurality of first slits SL1. Each of the plurality of first slits SL1 may be configured to align with a corresponding irradiator 123 (e.g., the first diverging lens L12 of FIGS. 2 to 7). For example, the light radiated from the irradiator 123 may pass the first slit SL1 and travel to the reaction vessel 102. The spacing between the first slits SL1 may be selected to pass light in a determined wavelength band. In an optional or additional embodiment, the plurality of first slits SL1 may be disposed on corresponding jig side surfaces B22. For example, one of the first slits SL1 may be disposed on a jig side surface B22 in the +X direction and another first slit SL1 may be disposed on a jig side surface B22 in the −X direction.

In an optional or additional embodiment, the jig 113 may include a plurality of second slits SL2. Each of the second slits SL2 may be configured to align with a corresponding light receiver 124 (e.g., the second diverging lens L22 of FIGS. 2 to 7). For example, the light penetrating (e.g., passing through) a substance in the reaction vessel 102 may pass the second slit SL2 and may travel to the light receiver 124. The spacing between the second slits SL2 may be selected to pass light in a determined wavelength band. In an optional or additional embodiment, each of the plurality of second slits SL2 may be disposed on a jig side surface B22 opposite to the jig side surface B22 on which the corresponding first slit SL1 is disposed. For example, one of the second slits SL2 may be disposed on a jig side surface B22 in the −X direction opposite to the jig side surface B22 in the +X direction on which the corresponding first slit SL1 is disposed and another second slit SL2 may be disposed on a jig side surface B22 in the −Y direction opposite to the jig side surface B22 in the +Y direction on which the corresponding first slit SL1 is disposed.

In an embodiment, the jig 113 may include a thermally conductive material. For example, the jig 113 may include a same material (e.g., a metal material) as the heating plate 112. Alternatively or additionally, the jig 113 may include a different material as the heating plate 112. In an embodiment, heat transferred to the jig 113 from the heating plate 112 may be conducted to the reaction vessel 102. The jig 113 may be integrally and seamlessly connected to the heating plate 112.

FIG. 8 illustrates the irradiator 123 arranged in the +X direction and the light receiver 124 arranged in the −Y direction. However, this is an example for describing the shape of the jig 113 and is not limited thereto. For example, a light receiver arranged in the −X direction opposite to the irradiator 123 and an irradiator arranged in the +Y direction opposite to the light receiver 124 may be disposed on corresponding slits, without departing from the scope of the present disclosure.

Figure 9:
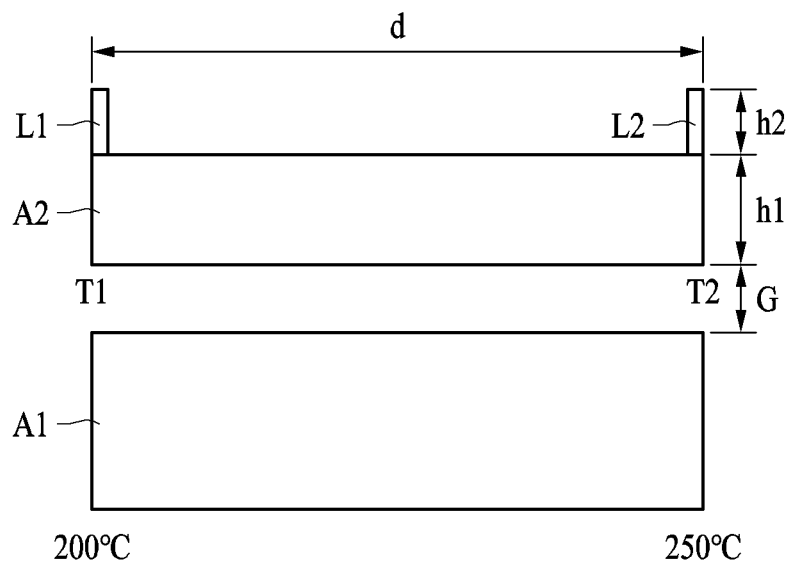
FIG. 9 is a diagram illustrating a floating barrel at a predetermined distance from a heating plate, according to an embodiment.

FIG. 9 is a diagram illustrating a floating barrel at a predetermined distance from a heating plate, according to an embodiment.

Referring to FIG. 9, a floating barrel A2 may be disposed with a gap G of approximately 5 millimeters (mm) from a heating plate A1. Heat transfer between the heating plate A1 and the floating barrel A2 may include heat transfer by convection. In an example depicted by FIG. 9, a coefficient of thermal expansion (CTE) of the floating barrel A2 may be selected to be approximately 135× 10-6 mm/° C. In such an example, a height h1 of the floating barrel A2 may be determined to be approximately 10 mm. Alternatively or additionally, a height h2 of a lens may be determined to be approximately 0.4 mm. That is, heights h2 of a first lens L1 (e.g., an irradiator lens) and a second lens L2 (e.g., a light receiver lens) arranged in the floating barrel A2 may be determined to be approximately 0.4 mm. A temperature change $\Delta T1$ at a first point T1 where the first lens L1 is disposed may be approximately 75 degrees Celsius (° C.) and a temperature change $\Delta T2$ at a second point T2 where the second lens L2 is disposed and apart from the first lens L1 by a distance d may be approximately 76° ° C.

Figure 10:
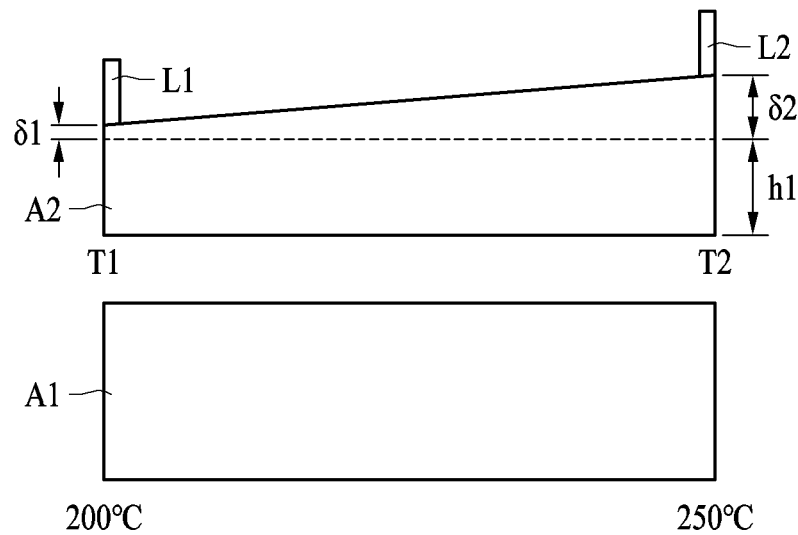
FIG. 10 is a diagram illustrating thermal deformation of a floating barrel at a predetermined distance from a heating plate, according to an embodiment.
Figure 11:
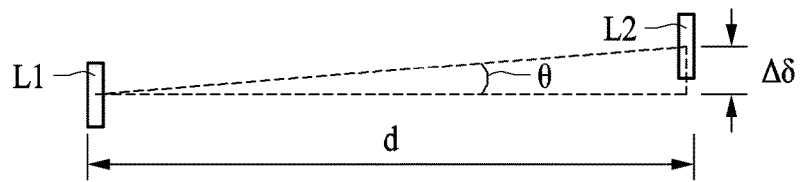
FIG. 11 is a diagram illustrating a height deviation of lenses, according to an embodiment.

FIG. 10 is a diagram illustrating thermal deformation of a floating barrel at a predetermined distance from a heating plate, according to an embodiment. FIG. 11 is a diagram illustrating a height deviation of lenses, according to an embodiment.

Referring to FIGS. 10 and 11, a thermal deformation amount $\delta$ at a point of the floating barrel A2 on which lenses L1 and L2 are disposed may be determined using an equation like $\delta = \alpha \times \Delta T \times h1$, where $\alpha$ represents the CTE of the floating barrel A2, $\Delta T$ represents the temperature change at the point of the floating barrel, and h1 represents the height of the floating barrel A2. For example, a thermal deformation amount $\delta 1$ of a first point T1 on the floating barrel A2 on which the irradiator lens L1 is disposed may be approximately 0.10125 mm and a thermal deformation amount $\delta 2$ of a second point T2 on the floating barrel A2 on which the light receiver lens L2 is disposed may be about 0.10260 mm. Thus, referring to FIG. 11, a height deviation 48 due to thermal deformation of the floating barrel A2 may be approximately 0.00135 mm, and a deviation angle $\theta$ may be approximately 0.00155 degrees. Because heights (h2 of FIG. 9) of the lenses L1 and L2 are approximately 0.4 mm, a height deviation of the lenses L1 and L2 due to thermal deformation may be calculated to be approximately 1.35 micrometers (μm). Consequently, a light loss rate due to thermal deformation may be approximately 0.338%.

Figure 12:
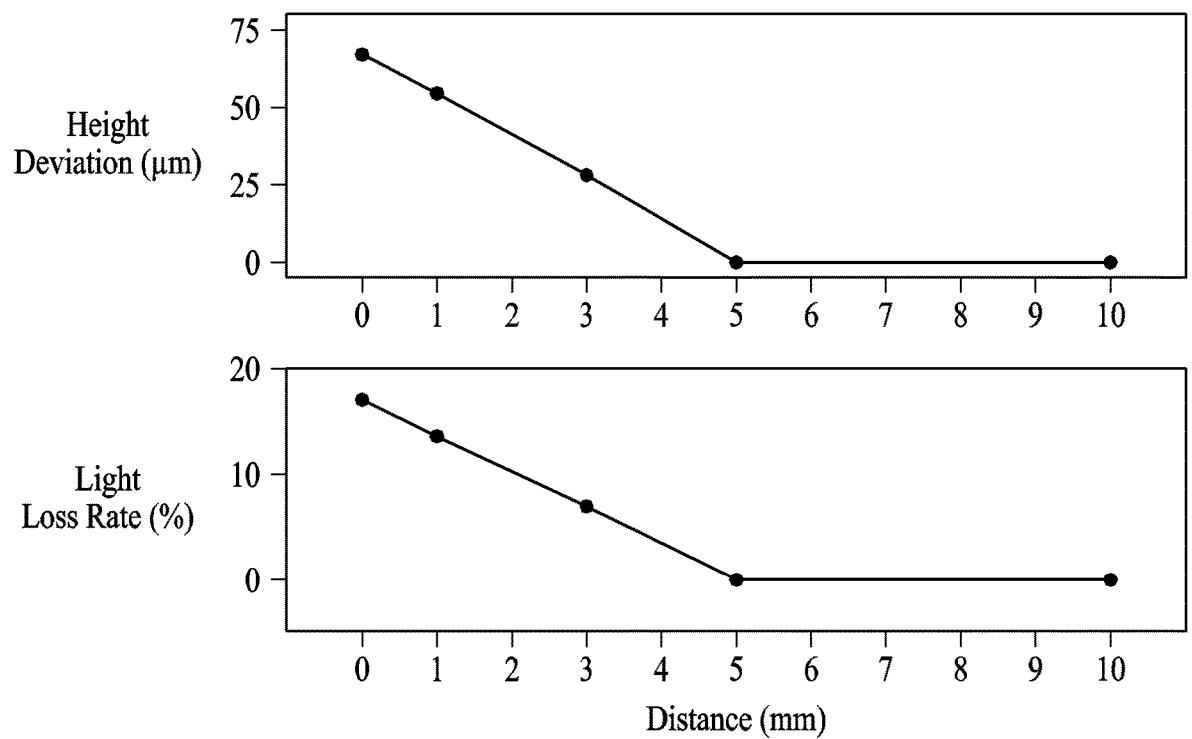
FIG. 12 are graphs showing a height deviation and a light loss factor based on a distance between a heating plate and a floating barrel, according to an embodiment.

FIG. 12 are graphs showing a height deviation due to thermal deformation (48) and a light loss rate due to the thermal deformation based on a distance between a heating plate and a floating barrel (e.g. gap G of FIG. 6), according to an embodiment.

Referring to FIG. 12 and Table 1, the height deviation and the light loss rate may be determined at the following distances: (i) at 0 mm (when a floating barrel contacts a heating plate), (ii) at approximately 1 mm, (iii) at approximately 3 mm, (iv) at approximately 5 mm, and (v) at approximately 10 mm. T1 may represent a temperature at a first point in which a first lens (e.g., the first lens L1 of FIGS. 9 to 11) is disposed and T2 may represent a temperature at a second point in which a second lens (e.g., the second lens L2 of FIGS. 9 to 11) is disposed. A PTFE having a CTE of approximately $135 \times 10^{-6}$ mm/° C. may be selected as a material of the floating barrel.

TABLE 1

Height Deviations and Light Loss Rates for PTFE.

| Distance (mm) | T1 (° C.) | T2 (° C.) | Height Deviation ($\Delta\delta$) (μm) | Light Loss Rate (%) |
|---|---|---|---|---|
| 0 | 200.0 | 250.0 | 67.50 | 16.8750 |
| 1 | 180.0 | 220.2 | 54.27 | 13.5675 |
| 3 | 140.0 | 160.6 | 27.81 | 6.9500 |
| 5 | 100.0 | 101.0 | 1.35 | 0.3375 |
| 10 | 30.0 | 30.2 | 0.27 | 0.0675 |

As shown in FIG. 12 and Table 1, as the distance increases, the height deviation of lenses due to thermal deformation may decrease, and thus, the light loss rate may decrease. For example, when the distance between the floating barrel and the heating plate is greater than or equal to approximately 5 mm, the light loss rate may be less than 1% (e.g., approximately a 99% confidence level). To achieve a light loss rate at a 95% confidence level, the distance may need to be greater than or equal to approximately 3 mm. Alternatively or additionally, when the floating barrel does not float from the heating plate and contacts the heating plate (e.g., distance is approximately 0 mm), the light loss rate may significantly increase and the measurement accuracy and repeatability of the optical monitoring device may decrease.

In an embodiment, an upper limit of the distance between the floating barrel 120 and the heating plate 112 may be determined based on an arrangement environment of the optical monitoring device (e.g., optical monitoring device 10 of FIG. 1, optical monitoring device 100 of FIGS. 2 to 8). For example, the upper limit of the distance between the floating barrel 120 and the heating plate 112 may be approximately 10 cm or less, approximately 8 cm or less, approximately 5 cm or less, approximately 3 cm or less, or approximately 2 cm or less.

Figure 13:
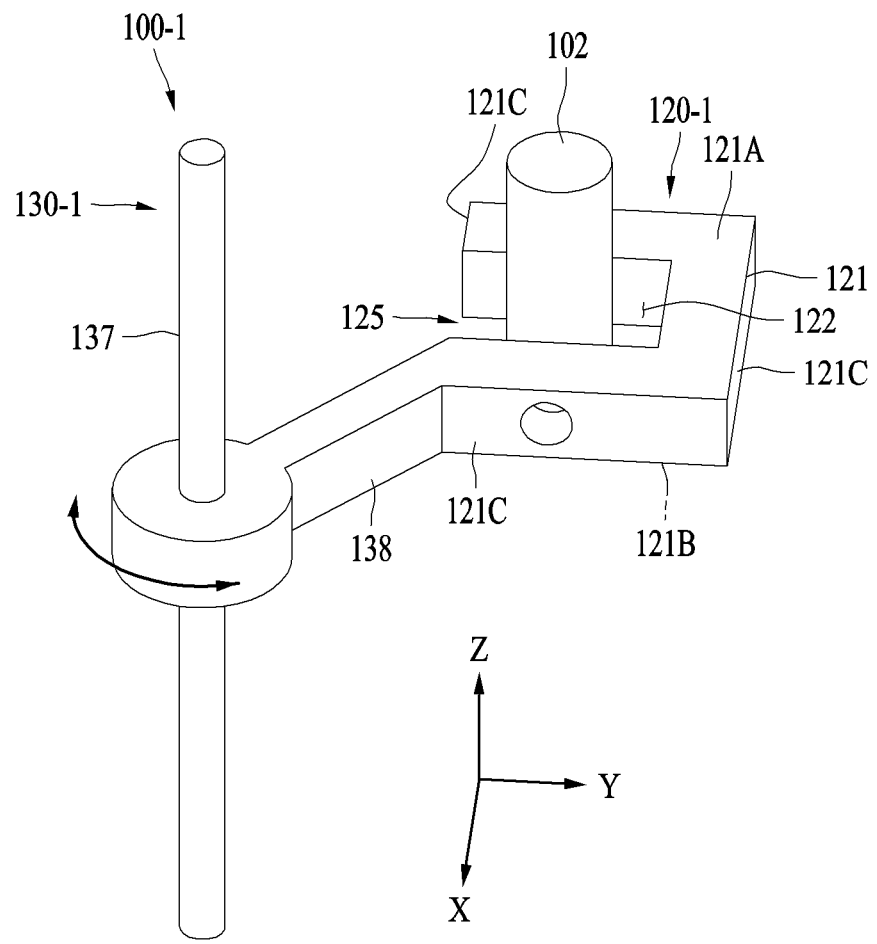
FIG. 13 is a perspective view of a floating barrel, according to an embodiment.

FIG. 13 is a perspective view of a floating barrel, according to an embodiment. An optical monitoring device 100-1 of FIG. 13 may include or may be similar in many respects to at least one of the optical monitoring device 10 and the optical monitoring device 100 described above with reference to FIGS. 1 to 8, and may include additional features not mentioned above.

Referring to FIG. 13, the optical monitoring device 100-1 may include a floating barrel 120-1. The floating barrel 120-1 may include a barrel body 121 and a cavity 122. The barrel body 121 may include a first barrel surface 121A, a second barrel surface 121B, and a plurality of side barrel surfaces 121C.

In an embodiment, the floating barrel 120-1 may include an access area 125. The access area 125 may be configured to allow access of a reaction vessel 102 from the outside of the barrel body 121 to inside the cavity 122. Alternatively or additionally, the access area 125 may be configured to allow access of the reaction vessel 102 from the cavity 122 to the outside of the barrel body 121. The access area 125 may be formed by opening at least a portion of regions of one of the plurality of side barrel surfaces 121C. A numerical value (e.g., a length, a width) of the access area 125 may be substantially the same as a numerical value (e.g., a length, a width) of the cavity 122. That is, dimensions of the access area 125 may be similar or substantially the same as corresponding dimensions of the cavity 122. The reaction vessel 102 may be separated from the barrel body 121 through the access area 125 from the cavity 122. In an optional or additional embodiment, a new reaction vessel may be disposed inside the cavity 122 through the access area 125.

In an embodiment, the optical monitoring device 100-1 may include a support body 130-1. The support body 130-1 may include a shaft 137 and an arm 138. The shaft 137 may include a fixed axis (e.g., the Z-axis) extending in a longitudinal direction. The arm 138 may be configured to connect the shaft 137 to the barrel body 121. For example, a first end of the arm 138 may be connected to the shaft 137 and a second end of the arm 138 that is opposite to the first end may be connected to a region (e.g., a corner region) of one of the side barrel surfaces 121C. Alternatively or additionally, the arm 138 may be configured to rotate on the shaft 137. For example, the barrel body 121 may have a configuration disposed in one position on a heating stirrer (e.g., the heating stirrer 110 of FIGS. 2 to 7) by rotation of the arm 138 on the shaft 137. Alternatively or additionally, the barrel body 121 may have a configuration disposed on a position offset from the aforementioned position on the heating stirrer 110.

Figure 14:
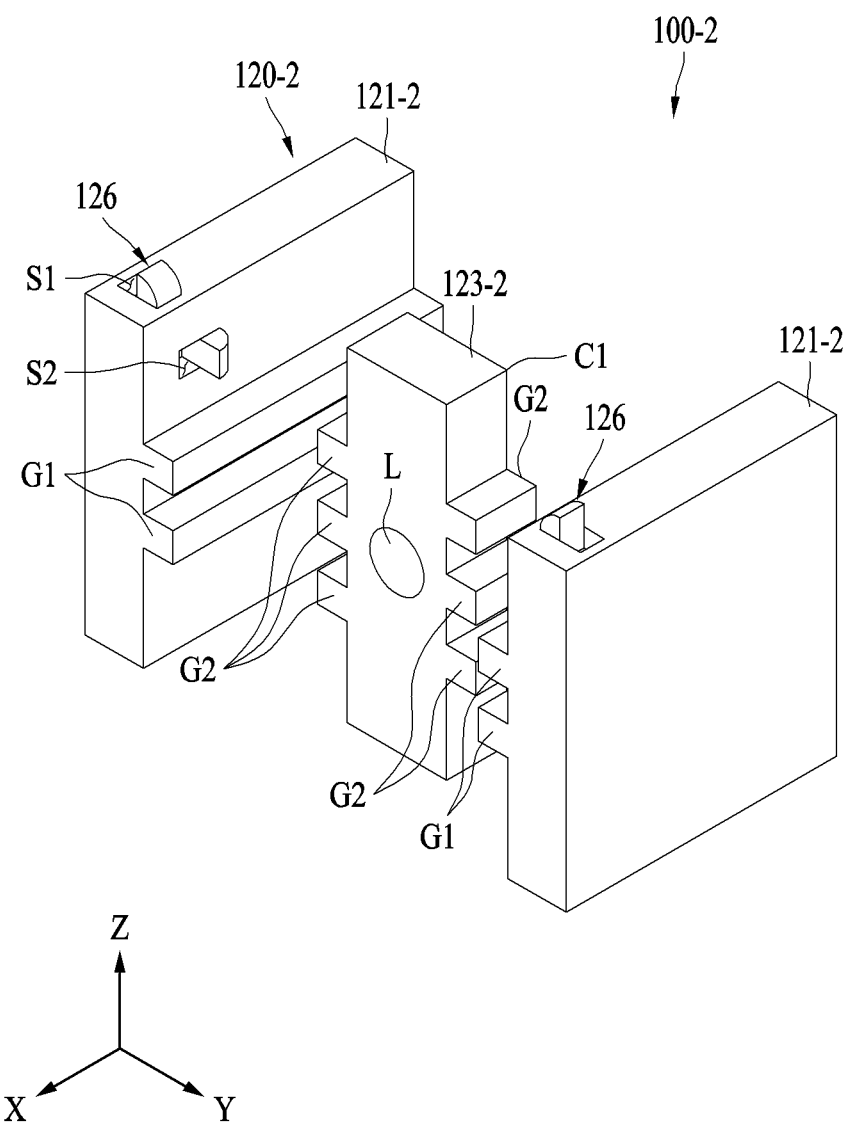
FIG. 14 is a perspective view of a linear guide, according to an embodiment.
Figure 15:
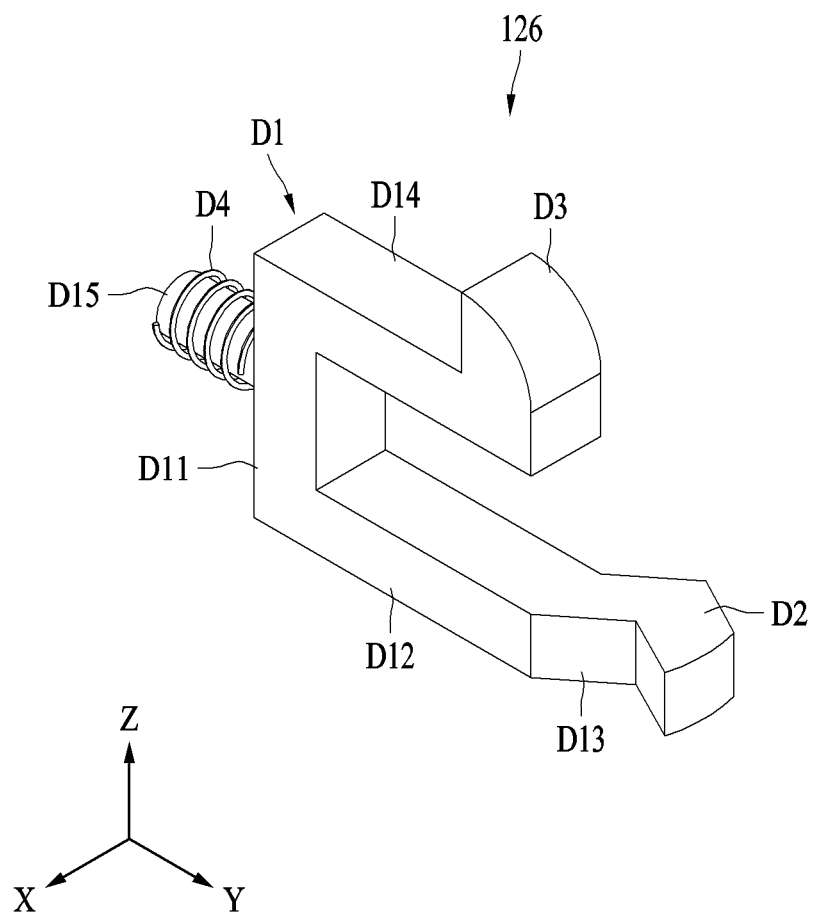
FIG. 15 is a perspective view of a structure for fixing and releasing a lens, according to an embodiment.

FIG. 14 is a perspective view of a linear guide, according to an embodiment. FIG. 15 is a perspective view of a structure for fixing and releasing a lens, according to an embodiment. An optical monitoring device 100-2 of FIG. 14 may include or may be similar in many respects to at least one of the optical monitoring device 10, the optical monitoring device 100, and the optical monitoring device 100-1 described above with reference to FIGS. 1 to 8 and 13, and may include additional features not mentioned above.

Referring to FIGS. 14 and 15, the optical monitoring device 100-2 may include a floating barrel 120-2. The floating barrel 120-2 may include a barrel body 121-2 and an irradiator 123-2. The irradiator 123-2 may include a lens housing C1 (e.g., a first lens housing C11 of FIGS. 2 to 7) and at least one lens L (e.g., a converging lens and/or a diverging lens).

In an embodiment, the barrel body 121-2 may include a plurality of first linear guides G1. The plurality of first linear guides G1 may be disposed on the inner surface of a passage facing the irradiator 123-2. Alternatively or additionally, the plurality of first linear guides G1 may extend in a direction (e.g., a direction toward the cavity 122 of FIGS. 2 to 7, a direction away from the cavity 122, and/or +X directions) along the inner surface of the passage. Each of the plurality of first linear guides G1 may include a rib shape. In an embodiment, the plurality of first linear guides G1 may be spaced apart from one another in another direction (e.g., the ±Z directions). In an optional or additional embodiment, the plurality of first linear guides G1 may include first linear guides G1 of a first group facing a first side of the irradiator 123-2 and first linear guides G1 of a second group facing a second side opposite to the first side of the irradiator 123-2.

In an optional or additional embodiment, the irradiator 123-2 may include a plurality of second linear guides G2. The plurality of second linear guides G2 may be configured to engage with the plurality of first linear guides G1. Consequently, the mutual engagement of the plurality of first linear guides G1 and the plurality of second linear guides G2 may reduce and/or prevent an offset of an optical axis of a lens L.

In an embodiment, the movement of the plurality of second linear guides G2 may be guided along the plurality of first linear guides G1. As the second linear guides G2 are guided by the first linear guides G1, the lens L may be configured to move in a direction (e.g., the −X direction) toward the cavity 122 of FIGS. 2 to 7 and/or a direction (e.g., the +X direction) away from the cavity 122. Alternatively or additionally, the movement of the plurality of second linear guides G2 may be guided in an extending direction (e.g., the +X directions) of the plurality of first linear guides G1.

In an embodiment, each of the plurality of second linear guides G2 may include a rib shape. The plurality of second linear guides G2 may be disposed on the plurality of first linear guides G1. Alternatively or additionally, the plurality of second linear guides G2 may be disposed on an outer surface of the lens housing C1 of the irradiator 123-2. In an embodiment, the plurality of second linear guides G2 may be spaced apart in a distancing direction (e.g., +Z directions) of the plurality of first linear guides G1. In some embodiments, the number of second linear guides G2 may be greater than the number of first linear guides G1. In an optional or additional embodiment, the plurality of second linear guides G2 may include a first group of second linear guides G2 configured to be guided by the first group of the first linear guides G1 and a second group of second linear guides G2 configured to be guided by the second group of the first linear guides G1.

In an embodiment, the floating barrel 120-2 may include a plurality of actuators 126. The actuator 126 may be configured to secure the lens housing C1 to the barrel body 121-2. Alternatively or additionally, the actuator 126 may be configured to release the lens housing C1 from the barrel body 121-2. The lens L in the lens housing C1 may be replaced as the lens housing C1 is separated from the barrel body 121 by the actuator 126, a new lens may be disposed in the lens housing C1, and then the lens housing C1 may be secured to the barrel body 121 by the actuator 126.

Referring to FIG. 15, the actuator 126 may include a slider D1. The slider D1 may be configured to slide in one or more directions (e.g., the +X directions, +Y directions) relative to the barrel body 121-2. The slider D1 may include a base arm D11. In some embodiments, the slider D1 may include a first extending arm D12 extending in a direction (e.g., the +Y direction) from a first end (e.g., an end in the −Z direction) of the base arm D11. Alternatively or additionally, the slider D1 may include a second extending arm D13 extending in another direction (e.g., the −X direction) from an end opposite to the end connected to the first end of the base arm D11 among ends of the first extending arm D12. In an optional or additional embodiment, the slider D1 may include a third extending arm D14 extending in a direction (e.g., the +Y direction) from a second end (e.g., an end in the +Z direction) of the base arm D11. In another optional or additional embodiment, the slider D1 may include a protrusion D15 protruding from a surface (e.g., the surface in the −Y normal direction) of the base arm D11.

In an embodiment, the actuator 126 may include a tab D2. The tab D2 may be configured to contact the lens housing C1 and press the lens housing C1. When the lens housing C1 is disposed in a passage in the lens barrel 121-2, the lens housing C1 may be pressed by the tab D2. A surface (e.g., the surface substantially in the +Y normal direction) of the tab D2 contacting the lens housing C1 may have a curved surface. Alternatively or additionally, the tab D2 may be disposed in a second slot S2 formed in the inner surface (e.g., the surface in the +Y normal direction) of the barrel body 121-2. In an optional or additional embodiment, the movement of the tab D2 may be guided in a longitudinal direction (e.g., the +X directions) of the second slot S2. In another optional or additional embodiment, the tab D2 may be connected to an end of the second extending arm D13.

In an optional or additional embodiment, the actuator 126 may include a handle D3. The handle D3 may be configured to transmit an external force (e.g., a gripping force of a user)

to the slider D1. For example, when a force is applied to the handle D3, the lens housing C1 may be separated from the barrel body 121-2. In some embodiments, the handle D3 may have a button shape. The handle D3 may be disposed in a first slot S1 formed in a surface (e.g., the surface in the +Z normal direction) of the barrel body 121-2. In an optional or additional embodiment, the movement of the handle D3 may be guided in a longitudinal direction (e.g., the +Y direction) of the first slot S1. The handle D3 may be connected to an end region of the third extending arm D14. In another optional or additional embodiment, the handle D3 may protrude in a direction (e.g., the +Z direction) from the third extending arm D14.

In an embodiment, the actuator 126 may include an elastic body D4. The elastic body D4 may elastically support the slider D1. Elastic support of the slider D1 may provide elasticity to the tab D2. For example, when the handle D3 is pulled in the −Y direction, the elastic body D4 may be compressed by the slider D1. Alternatively or additionally, when the handle D3 is pushed in the +Y direction, the elastic body D4 may be decompressed. In some embodiments, the elastic body D4 may include a compression spring. The elastic body D4 may be disposed to enclose the protrusion D15.

Referring to FIG. 14, one of the actuators 126 may be disposed on a portion of the barrel body 121-2 facing the first side of the lens housing C1 and another actuator 126 may be disposed on a portion of the barrel body 121-2 facing the second side opposite to the first side of the lens housing C1.

In an embodiment, the floating barrel 120-2 may include a light receiver having a similar structure to the irradiator 123-2. The light receiver may include at least one linear guide that is substantially similar and/or the same as the second linear guide G2.

Figure 16:
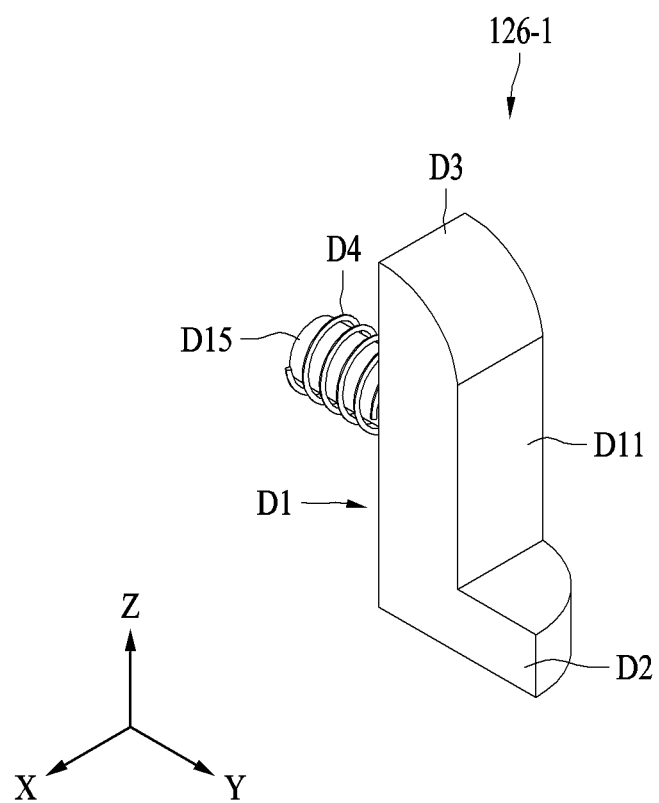
FIG. 16 is a perspective view of a structure for fixing and releasing a lens, according to an embodiment.

FIG. 16 is a perspective view of a structure for fixing and releasing a lens, according to an embodiment. An actuator 126-1 of FIG. 16 may include or may be similar in many respects to the actuator 126 described above with reference to FIGS. 14 and 15, and may include additional features not mentioned above.

Referring to FIG. 16, the actuator 126-1 may include a slider D1, a tab D2, a handle D3, a protrusion D15, and an elastic body D4. The slider D1 may include a base arm D11. The tab D2 may be disposed in a first side region (e.g., a region in the +Y normal direction adjacent to the surface in the −Z normal direction) adjacent to the first end region of the base arm D11. The handle D3 may be disposed in a second end region (e.g., a surface in the +Z normal direction) of the base arm D12. The protrusion D15 may be disposed on a second side region (e.g., a region in the −Y normal direction) opposite to the first side region of the base arm D11.

Figure 17:
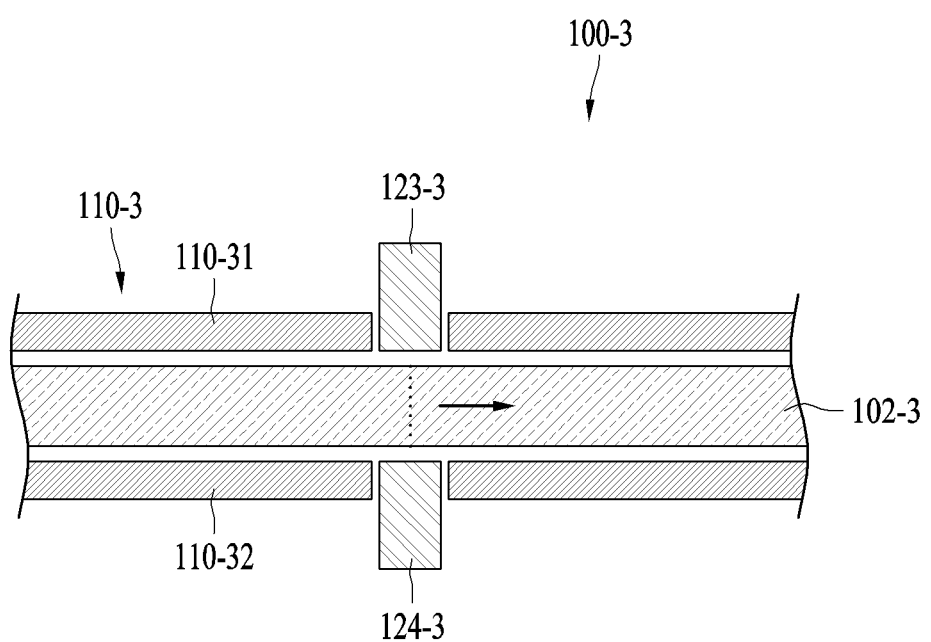
FIG. 17 is a diagram schematically illustrating an optical monitoring device, according to an embodiment.

FIG. 17 is a diagram schematically illustrating an optical monitoring device, according to an embodiment. An optical monitoring device 100-3 of FIG. 17 may include or may be similar in many respects to at least one of the optical monitoring device 10, the optical monitoring device 100, the optical monitoring device 100-1, and the optical monitoring device 100-2 described above with reference to FIGS. 1 to 8 and 13 to 14, and may include additional features not mentioned above.

Referring to FIG. 17, the optical monitoring device 100-3 may be configured to monitor a chemical change of a reactant in a conduit 102-3 in real-time. The reactant may flow along the conduit 102-3.

In an embodiment, the optical monitoring device 100-3 may include a heating stirrer 110-3. The heating stirrer 110-3 may have a shape enclosing the conduit 102-3. The heating stirrer 110-3 may be configured to transfer thermal energy and/or stirring energy to both sides of the conduit 102-3. For example, the heating stirrer 110-3 may include a first heating stirrer 110-31 disposed on a first side (e.g., the upper side of FIG. 17) of the conduit 102-3 and a second heating stirrer 110-32 disposed on a second side (e.g., the lower side of FIG. 17) opposite to the first side of the conduit 102-3. Alternatively or additionally, the first heating stirrer 110-31 and the second heating stirrer 110-32 may extend along the length of the conduit 102-3.

In an embodiment, the optical monitoring device 100-3 may include an irradiator 123-3 and a light receiver 124-3. The irradiator 123-3 may be disposed on the first side (e.g., the first heating stirrer 110-31) of the heating stirrer 110-3. The light receiver 124-3 may be disposed on the second side (e.g., the second heating stirrer 110-32) of the heating stirrer 110-3. In some embodiments, the irradiator 123-3 and the light receiver 124-3 may be thermally and/or physically separated from the heating stirrer 110-3 in a similar manner described with reference to FIGS. 2 to 7. Alternatively or additionally, the irradiator 123-3 and the light receiver 124-3 may form a light path at a predetermined position of the conduit 102-3.

Figure 18:
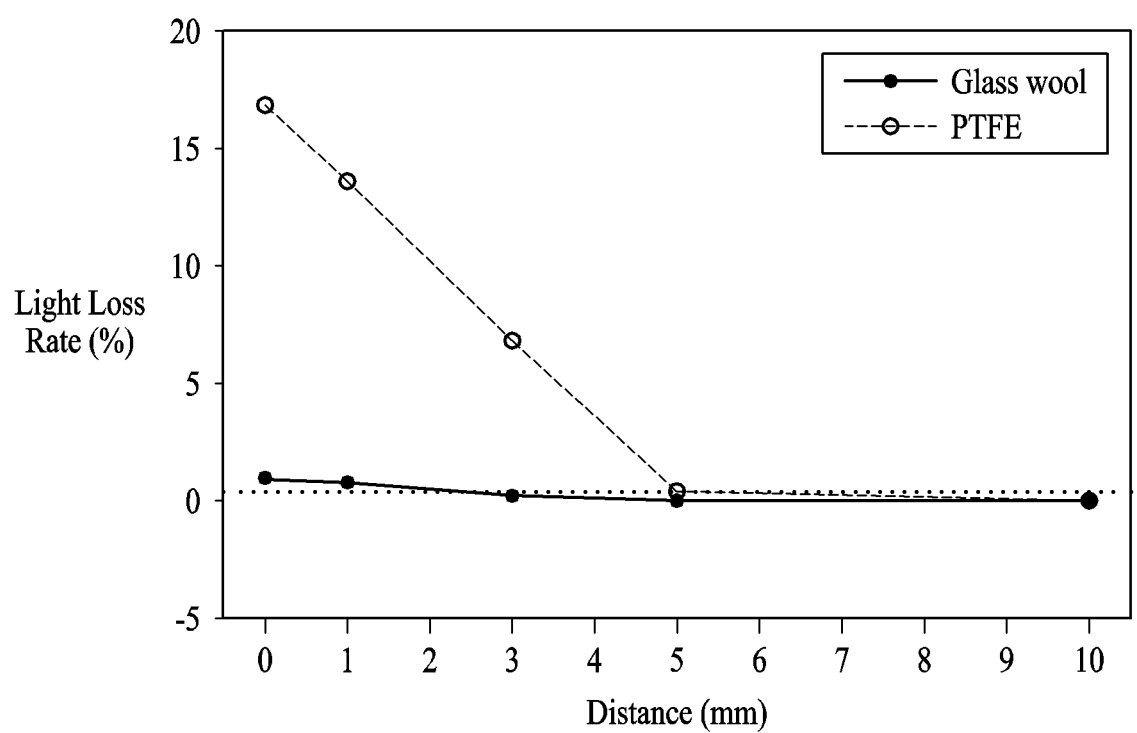
FIG. 18 is a graph showing a light loss factor based on a distance between a heating plate and a floating barrel, according to an embodiment.

FIG. 18 is a graph showing a light loss factor based on a distance between a heating plate and a floating barrel, according to an embodiment.

Referring to FIG. 18 and Table 2, the light loss rate may be determined at the following distances: (i) at 0 mm (when a floating barrel contacts a heating plate), (ii) at approximately 1 mm, (iii) at approximately 2 mm, (iv) at approximately 3 mm, (v) at approximately 5 mm, and (vi) at approximately 10 mm. T1 may represent a temperature at a first point in which a first lens (e.g., the first lens L1 of FIGS. 9 to 11) is disposed and T2 may represent a temperature at a second point in which a second lens (e.g., the second lens L2 of FIGS. 9 to 11) is disposed. Materials of the floating barrels may be selected to be PTFE and glass wool having CTEs of approximately $135 \times 10^{-6}$ mm/° C. and $9.694 \times 10^{-6}$ mm/° C., respectively. That is, the thermal conductivity of glass wool may be less than the thermal conductivity of PTFE.

TABLE 2

Height Deviations and Light Loss Rates for Glass Wool.

| Distance (mm) | T1 (° C.) | T2 (° C.) | Height Deviation (Δδ) (μm) | Light Loss Rate (%) |
| --- | --- | --- | --- | --- |
| 0 | 50.0 | 90.0 | 3.88 | 0.9694 |
| 1 | 47.0 | 77.2 | 2.93 | 0.7319 |
| 2 | 43.0 | 64.0 | 2.93 | 0.5089 |
| 3 | 40.0 | 53.2 | 1.47 | 0.3199 |
| 5 | 34.0 | 34.5 | 0.09 | 0.0242 |
| 10 | 30.0 | 30.2 | 0.02 | 0.0049 |

As shown in Table 1, a light loss rate of 0.3375% at a distance of approximately 5 mm may be calculated for PTFE. Alternatively, as shown in FIG. 18 and Table 2, glass wool may have a light loss rate of 0.3199% at a distance of approximately 3 mm. That is, the light loss rate when the material of the floating barrel is glass wool and the distance is set to approximately 3 mm may be similar to the light loss rate when the material of the floating barrel is PTFE and the distance is set to approximately 5 mm.

While the present disclosure includes specific examples, it is to be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. For example, suitable results may be achieved when the described techniques are performed in a different order and/or when components in a described system, architecture, device, or circuit are combined in a different manner and/or replaced or supplemented by other components or their equivalents.

What is claimed is:

1. An optical monitoring device, comprising:
   a heating stirrer;
   a floating barrel; and
   a support body arranged to support the floating barrel, wherein the floating barrel comprises:
      a barrel body facing the heating stirrer and spaced apart from the heating stirrer by a gap;
      a cavity provided in the barrel body and configured to accommodate at least one of a vessel and a conduit;
      an irradiator arranged in the barrel body and configured to radiate light to the cavity; and
      a light receiver arranged in the barrel body, aligned with the irradiator and the cavity, and configured to receive light from the cavity.

2. The optical monitoring device of claim 1, wherein a size of the gap between the barrel body and the heating stirrer is greater than or equal to 3 mm.

3. The optical monitoring device of claim 1, wherein the support body comprises:
   a holder configured to hold the floating barrel;
   a plurality of guide rails configured to guide movement of the holder; and
   a plurality of legs coupling the holder to the plurality of guide rails.

4. The optical monitoring device of claim 3, wherein the support body further comprises a knob configured to adjust a position of a leg of the plurality of legs on a corresponding guide rail of the plurality of guide rails.

5. The optical monitoring device of claim 3, wherein each of the plurality of legs comprises a tab hole configured to pass a corresponding guide rail of the plurality of guide rails.

6. The optical monitoring device of claim 1, wherein the heating stirrer comprises:
   a heating plate facing the barrel body; and
   a jig protruding from the heating plate, and configured to separate at least one of the vessel and the conduit, from the barrel body.

7. The optical monitoring device of claim 6, wherein the jig comprises:
   a first slit aligned with the irradiator; and
   a second slit aligned with the light receiver.

8. The optical monitoring device of claim 1, wherein the barrel body comprises an insulating material.

9. The optical monitoring device of claim 1, wherein the barrel body comprises:
   a first passage extending from the cavity and configured to accommodate the irradiator; and
   a second passage extending from the cavity and configured to accommodate the light receiver.

10. The optical monitoring device of claim 1, wherein each of the irradiator and the light receiver comprises:
    at least one lens; and
    a lens housing configured to accommodate the at least one lens;
    wherein the lens housing is further configured to be detachably coupled to the barrel body.

11. The optical monitoring device of claim 10, wherein the at least one lens comprises a converging lens and a diverging lens.

12. The optical monitoring device of claim 1, further comprising:
    a light source configured to generate light in a determined wavelength band; and
    a spectroscope configured to analyze at least a portion of the light generated by the light source and received by the light receiver that has been radiated by the irradiator and has passed through at least one of the vessel and the conduit.

13. The optical monitoring device of claim 1, further comprising:
    a chiller configured to cool at least one of the vessel and the conduit.

14. The optical monitoring device of claim 13, further comprising:
    a circulator configured to circulate a cooling liquid to the chiller.

15. The optical monitoring device of claim 1, wherein the barrel body further comprises an access area open to the cavity.

16. The optical monitoring device of claim 1, further comprising:
    a shaft; and
    an arm configured to connect the shaft to the floating barrel and rotate relative to the shaft.

17. The optical monitoring device of claim 1, further comprising:
    a first linear guide configured to guide linear movement of a first lens of the irradiator in a first direction toward the cavity and a second direction away from the cavity; and
    a second linear guide configured to guide linear movement of a second lens the light receiver in the first direction toward the cavity and the second direction away from the cavity.

18. The optical monitoring device of claim 1, further comprising:
    a tab configured to secure a lens of at least one of the irradiator and the light receiver; and
    an elastic body configured to elastically support the tab.

19. The optical monitoring device of claim 18, further comprising:
    a slider configured to:
       slide in a first direction away from the lens;
       slide in a second direction toward the lens; and
       deform the elastic body.

20. The optical monitoring device of claim 19, further comprising:
    a handle coupled to the slider.

* * * * *